United States Patent
Okumura et al.

(10) Patent No.: US 9,234,458 B2
(45) Date of Patent: Jan. 12, 2016

(54) INSTALLATION DEVICE FOR INSTRUMENTATION DEVICE OF STATIONARY ENGINE

(75) Inventors: Hideaki Okumura, Tokyo (JP); Kimihiko Maehata, Tokyo (JP); Yuta Furukawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/003,327

(22) PCT Filed: Oct. 21, 2011

(86) PCT No.: PCT/JP2011/074252
§ 371 (c)(1),
(2), (4) Date: Sep. 30, 2013

(87) PCT Pub. No.: WO2012/132080
PCT Pub. Date: Oct. 4, 2012

(65) Prior Publication Data
US 2014/0014809 A1    Jan. 16, 2014

(30) Foreign Application Priority Data
Mar. 31, 2011  (JP) .................................. 2011-080418

(51) Int. Cl.
*F02D 35/00* (2006.01)
*F02B 63/00* (2006.01)
(Continued)

(52) U.S. Cl.
CPC ................. *F02B 77/00* (2013.01); *F02B 63/00* (2013.01); *F02B 77/085* (2013.01);
(Continued)

(58) Field of Classification Search
CPC . F02M 55/04; F02M 57/005; F02M 2200/04; F02M 2200/315; F02M 55/02; F20D 36/00; F02B 77/085; F02B 63/00

USPC ......... 248/610, 612, 618, 550, 636, 560, 562, 248/638; 73/430, 431; 123/469, 494, 467, 123/456, 457
See application file for complete search history.

(56) References Cited

U.S. PATENT DOCUMENTS 2,960,785 A * 11/1960 Kies ................................ 40/604
5,237,871 A * 8/1993 Henderson et al. ............. 73/493
(Continued)

FOREIGN PATENT DOCUMENTS

| CN | 1696564 | 11/2005 |
| CN | 1721682 | 1/2006 |

(Continued)

OTHER PUBLICATIONS

Extended European Search Report issued Dec. 18, 2014 in corresponding European Application No. 11862401.4.
(Continued)

*Primary Examiner* — Tan Le
(74) *Attorney, Agent, or Firm* — Wenderoth, Lind & Ponack, L.L.P.

(57) ABSTRACT

A cylinder head of a stationary gas engine is provided with a cylinder internal pressure sensor. An engine frame is provided with an instrumentation device installation device. An amplifier for amplifying a signal detected by the cylinder internal pressure sensor is fixed to the instrumentation device installation device. The instrumentation device installation device includes a suspending tool formed of a fixing plate which is in contact with a horizontal plane and is fixed thereto by bolts, an extension plate bent at a right angle to the fixing plate, and a suspending plate bent at a right angle to the extension plate and arranged in parallel with the fixing plate, and a coil spring connected at one end thereof to the suspending plate, and connected at the other end thereof to a fixing band for holding the amplifier.

5 Claims, 8 Drawing Sheets

(51) Int. Cl.
*F02B 77/00* (2006.01)
*F02B 77/08* (2006.01)
*F16F 15/067* (2006.01)
*F02M 55/02* (2006.01)
*F02G 1/055* (2006.01)
*F02D 41/00* (2006.01)
*F02D 19/02* (2006.01)
*F02D 35/02* (2006.01)

(52) U.S. Cl.
CPC ............ *F16F 15/067* (2013.01); *F02D 19/025* (2013.01); *F02D 35/023* (2013.01); *F02D 41/0027* (2013.01); *F02D 2400/21* (2013.01); *F02G 1/055* (2013.01); *F02M 55/02* (2013.01)

(56) References Cited

U.S. PATENT DOCUMENTS

| | | | | |
|---|---|---|---|---|
| 6,983,593 | B2* | 1/2006 | Gregory | F02G 1/0435 60/517 |
| 7,004,146 | B1* | 2/2006 | Kato | 123/467 |
| 7,055,321 | B2* | 6/2006 | Yoshida | F02G 1/055 60/517 |
| 2014/0014809 | A1* | 1/2014 | Okumura et al. | 248/610 |

FOREIGN PATENT DOCUMENTS

| | | |
|---|---|---|
| CN | 201751626 | 2/2011 |
| DE | 7403814 | 5/1974 |
| JP | 2-296029 | 12/1990 |
| JP | 7-32242 | 6/1995 |
| JP | 2001-65386 | 3/2001 |
| JP | 2005-265005 | 9/2005 |
| JP | 3130410 | 3/2007 |
| JP | 2009-264235 | 11/2009 |
| WO | 2009/130807 | 10/2009 |

OTHER PUBLICATIONS

International Search Report issued Jan. 17, 2012 in corresponding International Application No. PCT/JP2011/074252.
International Preliminary Report on Patentability and Written Opinion of the International Searching Authority (with English translation) issued Oct. 2, 2013 in corresponding International Application No. PCT/JP2011/074252.
Office Action (with English Translation) issued Mar. 13, 2013 in corresponding Japanese Application No. 2011-080418.
Decision to grant a patent (with English translation) issued Jun. 4, 2013 in corresponding Japanese Application No. 2011-080418.
Office Action issued May 6, 2015 in corresponding Chinese patent application No. 201180069182.2 (with English translation).
Notice of Allowance issued Jun. 5, 2015 in corresponding Korean Application No. 10-2013-7025123 (with English translation).

* cited by examiner

INSTALLATION DEVICE FOR INSTRUMENTATION DEVICE OF STATIONARY ENGINE

BACKGROUND OF THE INVENTION

1. Technical Field

The present invention relates to an installation device for an instrumentation device which inhibits transmission of vibration to the instrumentation device to be mounted to the engine frame of a stationary engine, and enables prevention of faults and malfunctions of the instrumentation device.

2. Description of the Related Art

When instrumentation devices such as a sensor and an amplifier are directly fixed to an engine frame, the vibration of the engine is transmitted to the instrumentation devices, which causes faults and malfunctions of the instrumentation devices. For this reason, when the instrumentation device is mounted to the engine frame, vibration isolating measures are required. Conventionally, there has been used, for example, a vibration isolating device as shown in FIG. 7.

Figure 7:
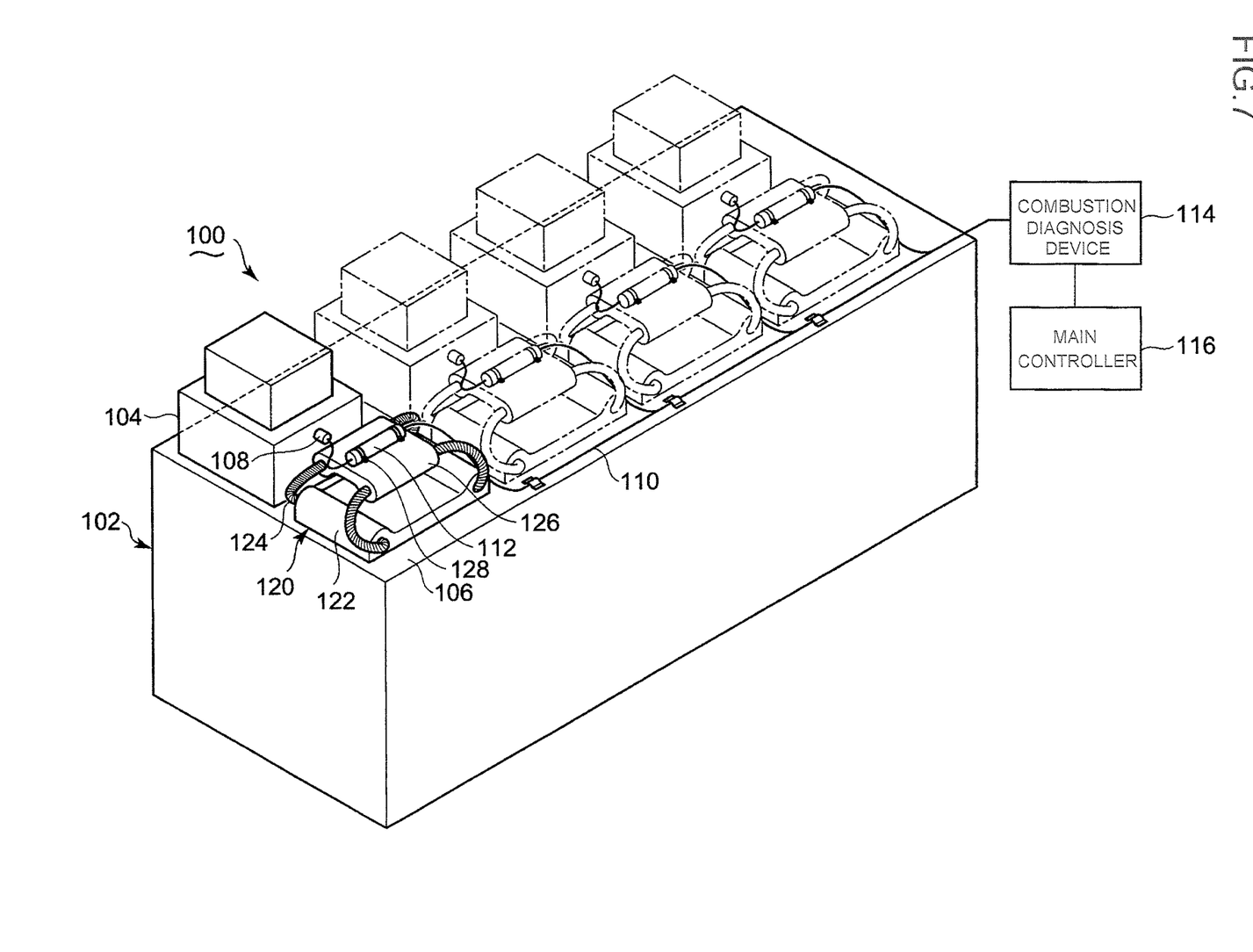
FIG. 7 is a perspective view of a stationary gas engine including a conventional instrumentation device installation device mounted thereon.

FIG. 7 shows an engine frame 102 of a stationary gas engine 100. The stationary gas engine 100 is provided with four cylinder heads 104. A cylinder internal pressure sensor 108 for detecting the combustion pressure in the cylinder is mounted for each cylinder head 104. A lead wire 110 is connected between the cylinder internal pressure sensor 108 and a combustion diagnosis device 114. The combustion pressure in the cylinder is transmitted to the combustion diagnosis device 114 by the lead wire 110. The diagnosis information by the combustion diagnosis device 114 is sent to a main controller 116 for controlling the operation of the stationary gas engine 100. An amplifier 112 is inserted at the midpoint of the lead wire 110.

On a plane 106 formed at the engine frame 102, an instrumentation device installation device 120 having a vibration isolating function is disposed for every cylinder. The instrumentation device installation device 120 includes a base 122 fixed to the plane 106, four wires 124 connected at respective one ends thereof to the four corners of the base 122, and a vibration isolating stage 126 to which the other ends of the wires 124 are connected. A fixing band 128 is bonded to the top surface of the vibration isolating stage 126. The amplifier 112 is held by the fixing band 128, and is fixed to the vibration isolating stage 126.

The vibration isolating stage 126 is supported in a floating sate in the air by the bending elastic force of the wires 124. Thus, by holding the amplifier 112 in a floating sate in the air, the vibration of the engine frame 102 is prevented from being transmitted to the amplifier 112. However, unfavorably, the instrumentation device installation device 120 has a complicated structure, and requires a space for installation thereof, and is expensive.

In Patent Document 1, there is disclosed a vibration isolating mechanism in which a fuel pressure (fuel pressure detection) sensor for detecting the pressure in the high pressure fuel path is mounted to the cylinder body via a vibration isolating material in an intra-cylinder fuel injecting type engine. The vibration isolating mechanism is configured as follows: the fuel pressure sensor is not in direct contact with the cylinder body; a gap is caused between the fuel pressure sensor and the cylinder body; and the fuel pressure sensor is fixed to the cylinder body via the vibration isolating material.

Patent Document 1: Japanese Patent Application Laid-open No. 2001-65386

The vibration isolating mechanism disclosed in Patent Document 1 is configured as follows: although the fuel pressure sensor is not directly fixed to the cylinder body, its own weight of the fuel pressure sensor is imposed on the cylinder body via the vibration isolating material. Accordingly, to the fuel pressure sensor, the vibration of the cylinder body becomes more likely to be transmitted through the vibration material. This imposes a given limit on the vibration isolating effect.

The stationary engine is mounted and fixed to a stationary stand. Accordingly, the vibration of the engine frame includes mostly only the vibration transmitted from the engine. For this reason, the vibrations of the engine frame are the vibrations including limited vibration frequencies. The vibrations having different vibration frequencies do not cancel each other. Thus, the vibration including a single frequency tends to be amplified. Further, when the vibration frequencies of the fuel pressure sensor and the vibration isolating material disclosed in Patent Document 1 are within a resonance generation region with the vibration frequency of the engine, the resonance phenomenon occurs, and a large vibration is caused in the fuel pressure sensor. This may cause faults or malfunction of the fuel pressure sensor.

Figure 8:
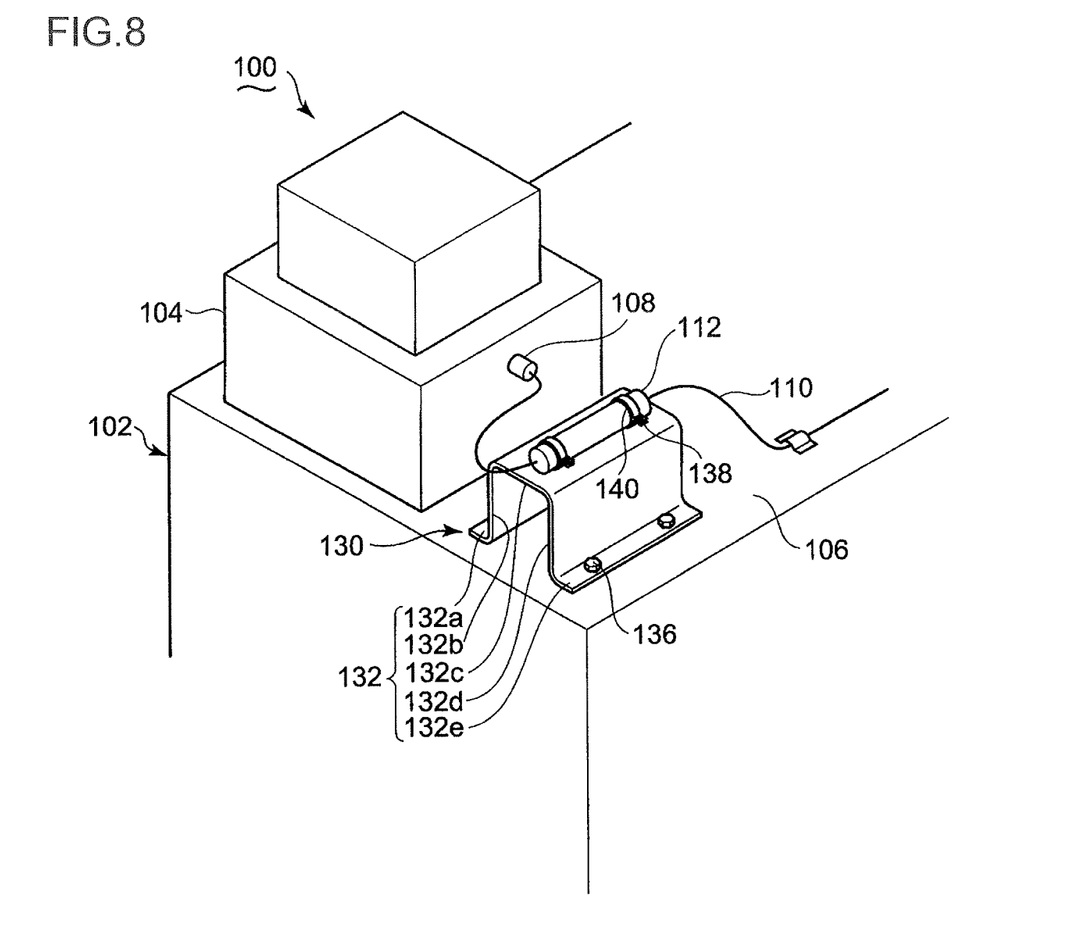
FIG. 8 is a perspective view showing an instrumentation device installation device (unpublished) as the intermediate technology invented before the present inventors reach the present invention.

In view of the foregoing circumstances, the present inventors conducted a study on measures for improving the vibration isolating effect of the instrumentation device installation device set in the engine frame of the stationary engine. FIG. 8 shows a vibration isolating device for a stationary gas engine (unpublished) as the intermediate technology invented before the present inventors reach the present invention.

In FIG. 8, the vibration isolating device 130 is formed of a fixing stand 132 including flange parts 132a and 132e formed by bending a plate made of one sheet of metal or hard resin, and being in contact with the plane 106 formed at the engine frame 102, sidewall parts 132b and 132d bent at right angles to the flange parts, and vertically arranged in a direction away from the plane 106, and a fixing part 132c disposed between the sidewall parts.

The flange parts 132a and 132e are bonded to the plane 106 by bolts 136. A fixing band 138 is bonded to the top surface of the fixing part 132c, and the amplifier 112 is held by the fixing band 138, and is fixed to the fixing part 132c. A vibration isolating rubber plate 140 is interposed between the fixing band 138 and the amplifier 112. The lead wire 110 establishes connections among the cylinder internal pressure sensor 108, the amplifier 112, and a combustion diagnosis device (not shown).

In such a vibration isolating device 130, the vibration of the engine frame 102 is attenuated by the vibration isolating rubber plate 140. However, the vibration transmitted from the engine frame 102 through the fixing stand 132 to the amplifier 112 is not eliminated. For this reason, as with the vibration isolating mechanism disclosed in Patent Document 1, a given limit is imposed on the vibration isolating effect.

SUMMARY OF THE INVENTION

In view of such a problem in the related-art technology, it is an object of the present invention to implement an instrumentation device installation device low in cost and improved in vibration isolating effect as an instrumentation device installation device to be mounted to the engine frame of a stationary engine, and to prevent the faults and malfunctions of the instrumentation device for achieving a longer life of the instrumentation device.

In order to attain such an object, an installation device for an instrumentation device of a stationary engine of the present invention includes: a suspending tool including a fixing part mounted and fixed to the engine frame, and an extension part connected to the fixing part and extending in a direction away from an engine frame surface, and a spring member connected at one end thereof to the extension part, and connected at the other end thereof to a holding tool for holding the instrumentation device. Then, the position in the spring member where the spring member is connected to the extension part is set at a position preventing the instrumentation device from coming in contact with the suspending tool even by a vibration of the engine frame, and the instrumentation device is suspended by the spring member with the spring member elongated by its own weight of the instrumentation device.

In the present invention device, the instrumentation device is suspended by the spring member with the spring member elongated by its own weight of the instrumentation device. For this reason, it is possible to enhance the attenuation effect of the vibration to be transmitted to the instrumentation device via the spring member. Further, a natural vibration frequency of each of the spring member and the instrumentation device is set outside a resonance occurrence region with respect to the vibration of the engine frame. For this reason, it is possible to prevent the resonance between the engine frame and the instrumentation device. Therefore, the vibration isolating effect of the instrumentation device can be improved, which prevents faults and malfunctions of the instrumentation device. This can achieve a longer life of the instrumentation device.

Incidentally, in the present description, the "engine frame" is assumed to embrace all the structures forming an engine accommodation body, and receiving the vibration transmitted from the engine, such as the cylinder body, the crank chamber, and the cylinder head.

In the present invention device, desirably, when the instrumentation device is formed of a major axis cylinder body, the major axis cylinder body is suspended at a plurality of portions in the axial direction by a plurality of the spring members while maintaining a posture in a horizontal direction, and a natural vibration frequency of each spring member is adjusted, thereby to adjust the natural vibration frequency of the whole spring members. Thus, the instrumentation device of the major axis cylinder body can be stably suspended by a plurality of the spring members while maintaining a posture in a horizontal direction. For this reason, it is possible to improve the effect of suppressing the vibration of the instrumentation device. Further, the natural vibration frequency of the spring member can be adjusted by simple means. For this reason, it is possible to readily avoid the resonance between the instrumentation device and the engine frame.

In the present invention device, desirably, when the instrumentation device is formed of a major axis cylinder body, a lead wire is connected to opposite ends in an axial direction of the major axis cylinder body, and the major axis cylinder body is suspended by a plurality of the spring members with its posture maintained in a vertical direction. Thus, the instrumentation device formed of the major axis cylinder body is supported in a vertical direction. As a result, it is possible to more effectively suppress the vibration of the opposite end portions of the major axis cylinder body. For this reason, it is possible to suppress the bending stress to be applied to the connection part of the lead wire connected to the opposite ends of the major axis cylinder body. For this reason, it is possible to improve the durability of the connection part of the lead wire. This can prevent fracture of the lead wire from the instrumentation device.

In the present invention device, desirably, the spring member is formed of double coil springs concentrically disposed and wound in mutually opposite directions, and a natural vibration frequency of each coil spring is adjusted, thereby to make the natural vibration frequency of the whole spring members variable. As a result, it is possible to increase the strength of the whole spring members, and it is possible to readily change the natural vibration frequency of the whole spring members. For this reason, it is possible to readily avoid the resonance between the instrumentation device and the engine frame.

In the present invention device, desirably, the spring member is formed of a coil spring, and a natural vibration frequency of the coil spring is made variable by changing an axial pitch of the coil spring. By such means, the natural vibration frequency of the spring member can be changed by simple means. This can readily avoid the resonance between the instrumentation device and the engine frame.

In accordance with the present invention device, there is provided an installation device for an instrumentation device of a stationary engine, for mounting an instrumentation device to a vibrating engine frame. The installation device includes: a suspending tool including a fixing part mounted and fixed to the engine frame, and an extension part connected to the fixing part and extending in a direction away from an engine frame surface, and a spring member connected at one end thereof to the extension part, and connected at the other end thereof to a holding tool for holding the instrumentation device. The position in the spring member where the spring member is connected to the extension part is set at a position preventing the instrumentation device from coming in contact with the suspending tool even by a vibration of the engine frame, and the instrumentation device is suspended by the spring member with the spring member elongated by its own weight of the instrumentation device. A natural vibration frequency of each of the spring member and the instrumentation device is set outside a resonance occurrence region with respect to the vibration frequency of the engine frame. Accordingly, it is possible to effectively attenuate the vibration of the engine frame to be transmitted to the instrumentation device via the spring member, and the resonance between the instrumentation device and the engine frame is not caused. For these reasons, it is possible to suppress the vibration of the instrumentation device disposed in the vibrating engine frame. Accordingly, it is possible to prevent faults and malfunctions of the instrumentation device. As a result, it is possible to achieve a longer life of the instrumentation device.

BRIEF DESCRIPTION OF THE DRAWINGS

FIGS. 3(A) and 3(B) relate to an instrumentation device installation device in accordance with Second Embodiment of the present invention device, where FIG. 3 (A) is a front view thereof.

DETAILED DESCRIPTION OF THE INVENTION

Below, the present invention will be described in details by way of embodiments shown in the accompanying drawings. However, the dimensions, materials, shapes, the relative arrangement thereof, and the like described in the embodiments are, unless otherwise specified, not construed as limiting the scope of the invention only thereto.

(First Embodiment)

Figure 1:
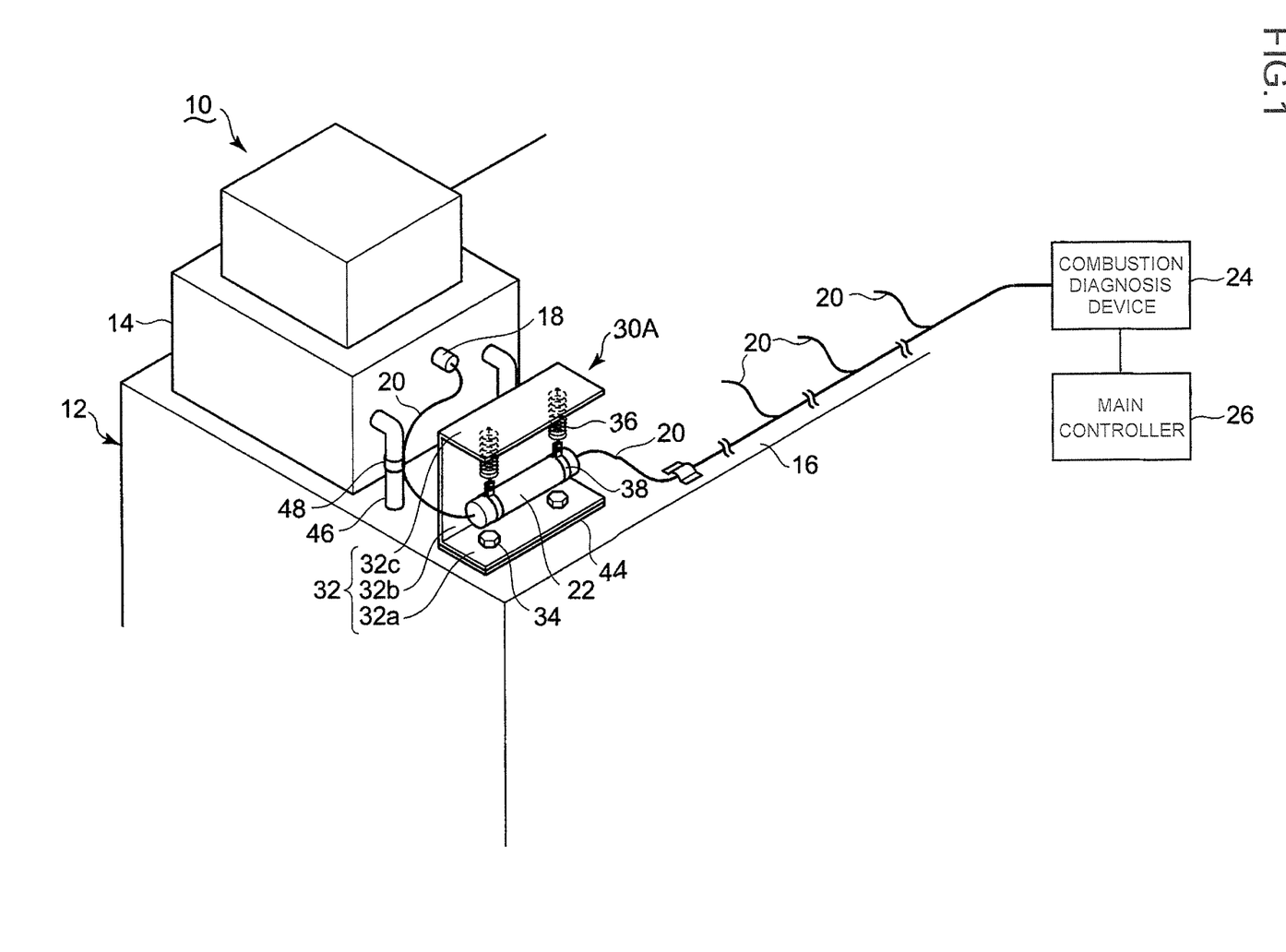
FIG. 1 is a perspective view of an instrumentation device installation device in accordance with First Embodiment of the present invention device.

First Embodiment of the present invention device will be described by reference to FIGS. 1 and 2. In FIG. 1, a stationary gas engine 10 includes four cylinder heads 14 as with FIG. 7. However, the three cylinder heads 14 are not shown. In each cylinder head 14, there is mounted a cylinder internal pressure sensor 18 for detecting the combustion pressure in the cylinder. A lead wire 20 is connected to the cylinder internal pressure sensor 18, and an amplifier 22 is inserted at the midpoint of the lead wire 20.

The lead wire 20 is fixed by a binding band 48 on the surface of a pipeline 46 disposed at the engine frame 12 between the cylinder internal pressure sensor 18 and the amplifier 22. A detection signal from the cylinder internal pressure sensor 18 is amplified at the amplifier 22, and is sent to a combustion diagnosis device 24 via the lead wire 20. A combustion diagnosis signal from the combustion diagnosis device 24 is sent to a main controller 26 for controlling the operation of the stationary gas engine 10.

An instrumentation device installation device 30A is mounted and fixed on a plane 16 of the engine frame 12. An instrumentation device installation device 30A is disposed for every cylinder head 14. However, in FIG. 1, only one instrumentation device installation device 30A is shown, and other instrumentation device installation devices 30A are not shown. The instrumentation device installation device 30A is formed of a suspending tool 32 formed by bending a plate made of a steel. The suspending tool 32 includes a fixing plate 32a in contact with the horizontal plane 16, an extension plate 32b bent at a right angle to the fixing plate 32a, and vertically arranged in a direction away from the plane 16, and a suspending plate 32c bent at a right angle to the extension plate 32b, and disposed in parallel with the fixing plate 32a.

The fixing plate 32a is bonded to the plane 16 by bolts 34. A vibration isolating rubber plate 44 maybe interposed between the plane 16 and the fixing plate 32a. Respective one ends of two coil springs 36 are connected to the suspending plate 32c. The other ends of the coil springs 36 are connected to the fixing band 38 made of steel, for suspending and supporting the amplifier 22. The amplifier 22 is formed of a major axis cylinder body, and the lead wire 20 is connected to the opposite ends thereof.

Figure 2:
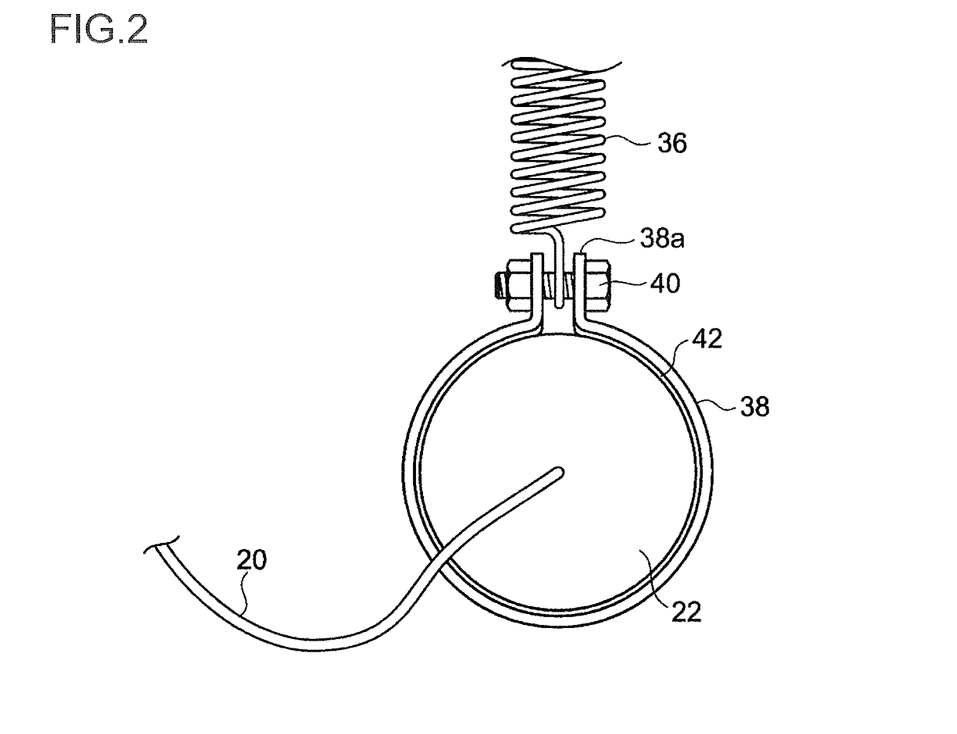
FIG. 2 is a partially enlarged view of the instrumentation device installation device.

In FIG. 2, the other end of the coil spring 36 is connected to the fixing band 38 via the bolt 40. The fixing band 38 has a circular shape along the outer circumferential surface of the amplifier 22 formed of a major axis cylinder body, and includes flat flange parts 38a integrally formed at opposites ends thereof. The fixing band 38 surrounds the amplifier 22, and the bolt 40 is threadedly connected to the flange parts 38a. The bolt 40 adjusts the gap between the flange parts 38a, so that the amplifier 22 is fastened and held by the fixing band 38. A vibration isolating rubber plate 42 is interposed between the outer circumferential surface of the amplifier 22 and the fixing band 38.

The suspending position of the amplifier 22 with respect to the suspending plate 32c is set at a position preventing contact with the extension plate 32b even by the vibration of the engine frame 12. Further, the natural vibration frequency of the coil spring 36 and the amplifier 22 is set to a vibration frequency that does not resonate with the vibration frequency of the engine to be transmitted to the engine frame 12. For the adjustment of the natural vibration frequency of the coil spring 36, the material, winding number, diameter, pitch, and the like thereof are adjusted. As a result, the natural vibration frequency can be readily set at a vibration frequency not resonating with the vibration frequency of the engine to be transmitted to the engine frame 12.

With such a configuration, the amplifier 22 is suspended by the coil spring 36. The coil spring 36 is in an elongated state by its own weight of the amplifier 22. Accordingly, it is possible to enhance the attenuation effect of the vibration to be transmitted to the amplifier 22 via the coil spring 36. Further, the natural vibration frequency of the amplifier 22 and the coil spring 36 is set to a vibration frequency that does not resonate with the vibration frequency of the engine to be transmitted to the engine frame 12. For this reason, it is possible to prevent the resonance between the amplifier 22 and the engine frame 12. Accordingly, it is possible to suppress the vibration of the amplifier 22. This can prevent faults and malfunctions. Whereas, the instrumentation device installation device 30A has a simple configuration, can be manufactured at a low cost, and is easy to mount to the engine frame 12.

Whereas, between the cylinder internal pressure sensor 18 and the amplifier 22, the lead wire 20 is fixed to the pipeline 46 by the binding band 48. For this reason, the vibration of the amplifier 22 can be reduced due to the rigidity of the lead wire 20.

(Second Embodiment)

Then, Second Embodiment of the present invention device will be described by way of FIG. 3. The present embodiment is also an example, in which the present invention is applied to the same stationary gas engine 10 as that of First Embodiment. In the present embodiment, the amplifier 22 as an instrumentation device, the suspending tool 32 forming the instrumentation device installation device 30B, and the coil spring 36 are equal in configuration to those of First Embodiment, and hence are given the same reference numerals and signs. In addition, the same members as those of First Embodiment are given the same reference numerals and signs.

Figure 3A:
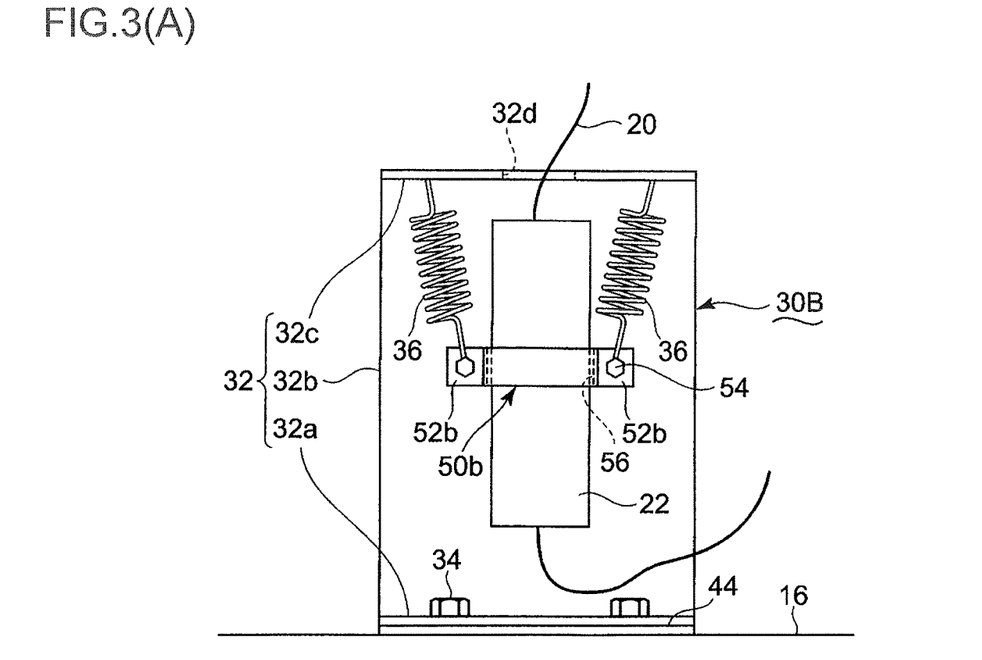
Figure 3B:
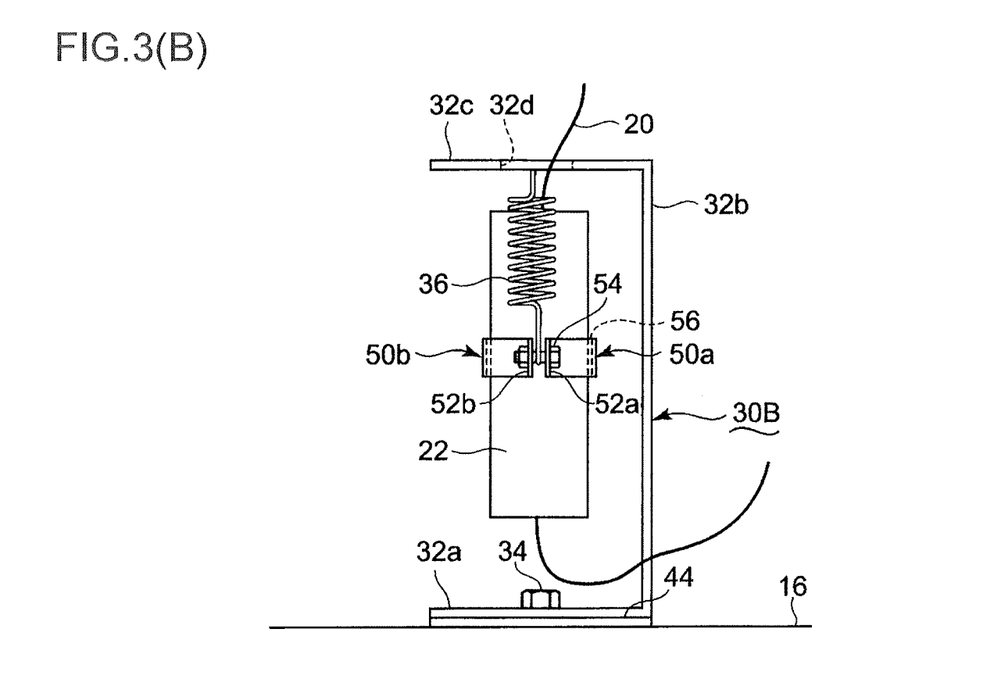
FIG. 3(B) is a side view thereof.

In FIG. 3, the amplifier 22 is formed of a major axis cylinder body, and the lead wire 20 is connected to the opposite ends of the major axis cylinder body. Further, the amplifier 22 is held by a pair of fixing bands 50a and 50b. The fixing bands 50a and 50b are formed in a semi-circular shape, and each have flat flange parts 52a and 52b at opposite ends thereof. A bolt 54 is threadedly connected to the flange parts 52a and 52b. The bolt 54 is operated to adjust the gap between the flange parts 52a and 52b, so that the central part of the amplifier 22 is fastened and held by the fixing bands 50a and 50b. A vibration isolating rubber plate 56 is interposed between the fixing bands 50a and 50b and the outer circumferential surface of the amplifier 22.

One end of the coil spring 36 is connected to the suspending plate 32c, and the other end thereof is connected to the bolt 54. A hole 32d is opened in the central part of the suspending plate 32c. The lead wire 20 is passed through the hole 32d.

With such a configuration, the amplifier 22 is suspended in a vertical posture by the coil springs 36. While the posture of the amplifier 22 is maintained in a vertical direction, the central part of the amplifier 22 is supported by the coil springs 36. Accordingly, even when the engine frame 12 vibrates, the fluctuation in the horizontal direction of the opposite end parts of the amplifier 22 can be more effectively suppressed.

With the instrumentation device installation device 30B of the present embodiment, the vibration of the amplifier 22 can be suppressed by a simple and low-cost configuration. Particularly, it is possible to prevent an increase in bending stress applied on the junction part of the lead wire 20 connected to both ends of the amplifier 22 due to vibration. For this reason, it is possible to prevent fracture or the like at the junction part of the lead wire 20.

(Third Embodiment)

Figure 4:
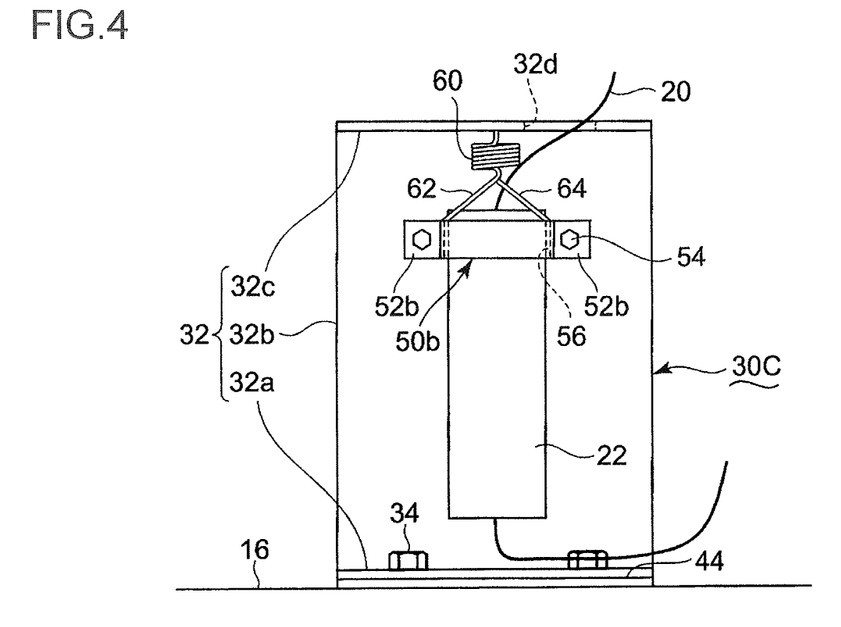
FIG. 4 is a front view of an instrumentation device installation device in accordance with Third Embodiment of the present invention device.

Then, Third Embodiment of the present invention device will be described by reference to FIG. 4. In an instrumentation device installation device 30C of the present invention shown in FIG. 4, the amplifier 22 formed of a major axis cylinder body is fastened and held at the vicinity of the upper end thereof by fixing bands 50a and 50b. Respective one ends of two wires 62 and 64 are respectively connected to bolts 54. The other ends of the wires 62 and 64 are connected to each other, and then connected to a coil spring 60. The other end of the coil spring 60 is connected to a suspending plate 32c. Thus, the amplifier 22 is suspended by one coil spring 60. The other configurations including those of the fixing bands 50a and 50b are the same as those of Second Embodiment.

With such a configuration, the amplifier 22 is suspended by one wire 62. For this reason, it is possible to further reduce the cost of the instrumentation device installation device 30C. In addition, it is possible to suppress the vibration of the instrumentation device installation device 30C, which can prevent faults and malfunctions of the amplifier 22. Particularly, the amplifier 22 is held at the upper end part thereof by the fixing bands 50a and 50b. Accordingly, the fluctuation of the upper end part of the amplifier 22 can be largely reduced. For this reason, it is possible to largely reduce the bending stress applied on the lead wire 20 connected to the upper end of the amplifier 22. Accordingly, it is possible to prevent fracture or the like of the lead wire 20.

(Fourth Embodiment)

Then, Fourth Embodiment of the present invention device will be described by reference to FIG. 5. The present embodiment is a modified example of the coil spring for use in the instrumentation device installation devices 30A to 30C. A coil spring forming body 70 of the present embodiment is formed of two coil springs 72 and 74 having different diameters, disposed concentrically with each other. The coil springs 72 and 74 are arranged in a mutually oppositely wound manner.

By using the coil spring 70 with such a configuration, it is possible to enhance the strength of the whole coil spring. Further, the coil springs 72 and 74 are adjusted in material, winding number, diameter, pitch, and the like, and thereby can be readily set at a vibration frequency not resonating with the vibration frequency of the engine to be transmitted to the engine frame 12. For this reason, it becomes easy to adjust the Young's modulus and the natural vibration frequency of the coil spring 70.

(Fifth Embodiment)

Figure 6:
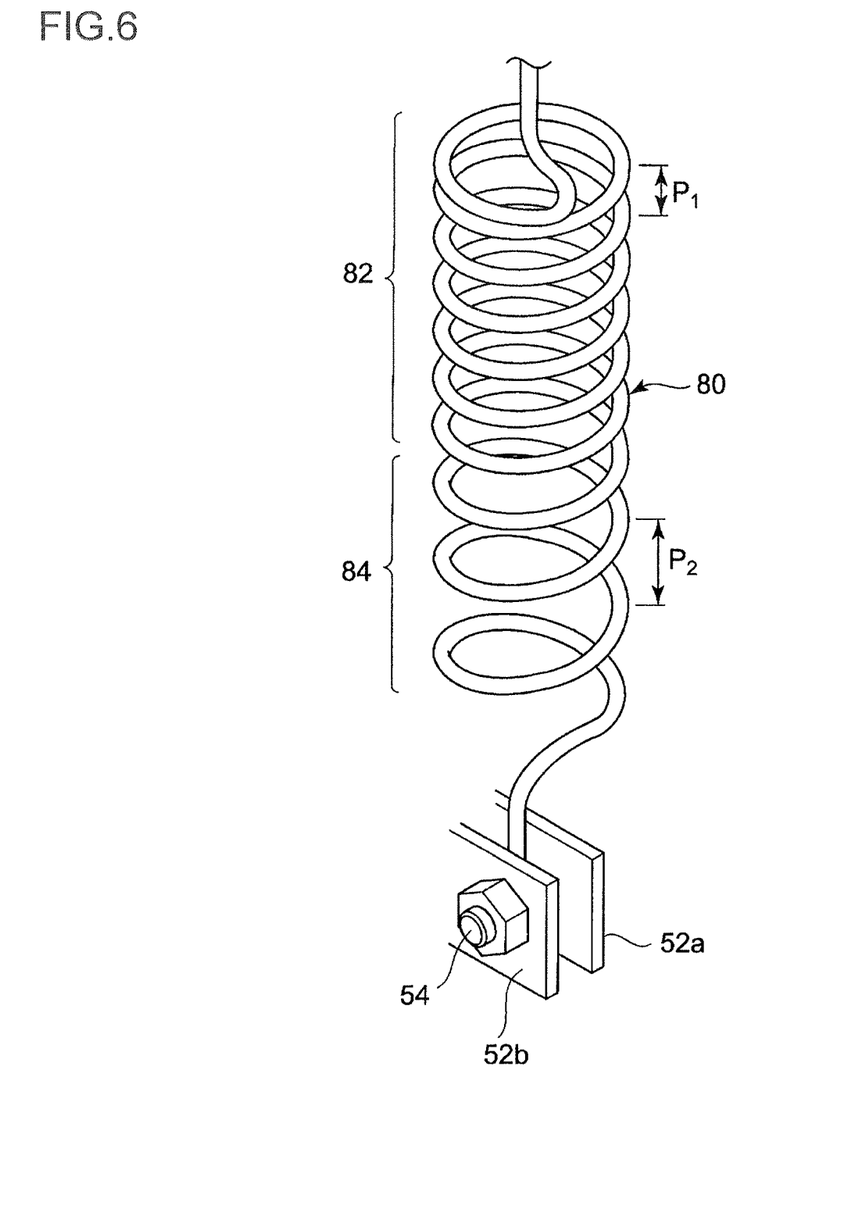
FIG. 6 is a perspective view showing another modified example of the spring member forming the present invention device.

Then, Fifth Embodiment of the present invention device will be described by reference to FIG. 6. The present embodiment is another modified example of the coil spring for use in the instrumentation device installation devices 30A to 30C. In FIG. 6, a coil spring 80 of the present embodiment includes an upper part 82 and a lower part 84 having different pitches. Namely, there is satisfied the relationship of Pitch $P_1$ of the upper part 82<Pitch $P_2$ of the lower part 84.

The coil spring 80 with such a configuration is used, and the pitches of the upper part 82 and the lower part 84 are appropriately adjusted. As a result, it becomes easy to adjust the Young's modulus and the natural vibration frequency of the coil spring 80.

Figure 5:
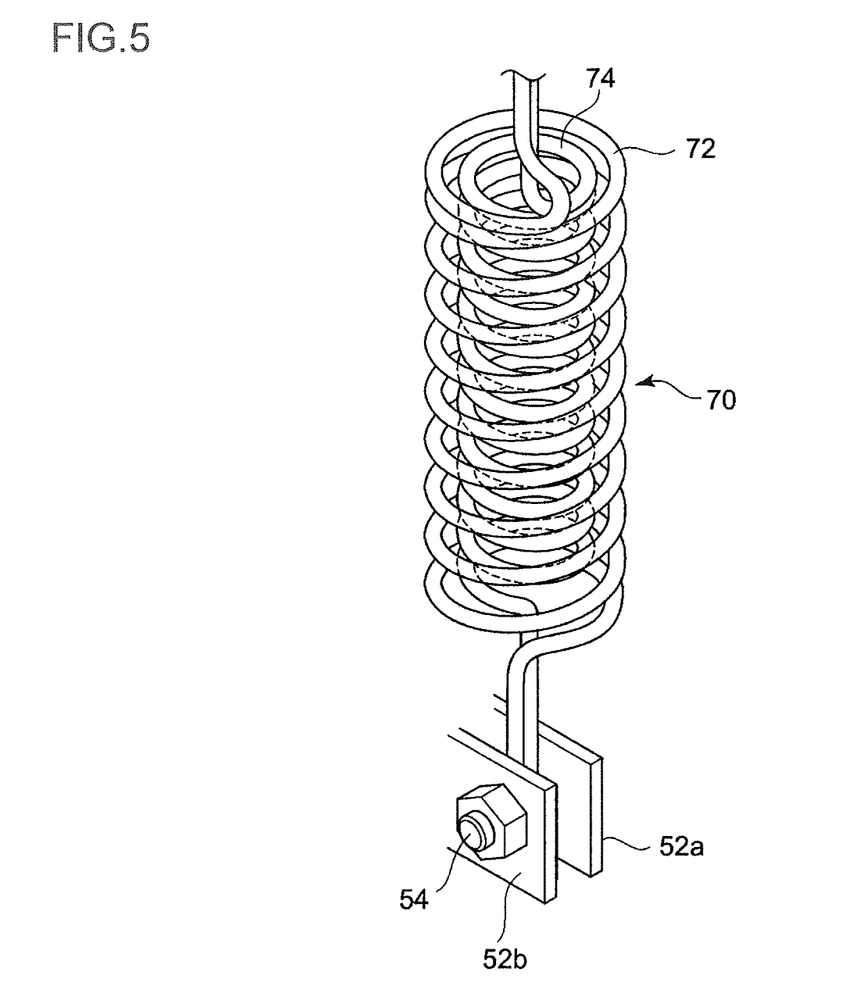
FIG. 5 is a perspective view showing a modified example of a spring member forming the present invention device.

Incidentally, the configuration of the coil spring 70 of Fifth Embodiment shown in FIG. 5 and the configuration of the coil spring 80 shown in FIG. 6 may be appropriately combined. As a result, the adjustment of the strength and the natural vibration frequency of the coil spring become further easier.

INDUSTRIAL APPLICABILITY

In accordance with the present invention, it is possible to prevent faults and malfunctions of the instrumentation device disposed at the engine frame of the stationary engine. This can achieve a longer life of the instrumentation device.

The invention claimed is:

1. An installation device for an instrumentation device of a stationary engine, for mounting the instrumentation device to an engine frame,
    the installation device comprising:
        a suspending tool including a fixing part mounted and fixed to the engine frame, and an extension part connected to the fixing part and extending in a direction away from an engine frame surface; and
        a spring member connected at one end thereof to the extension part, and connected at the other end thereof to a holding tool for holding the instrumentation device, the spring member being suspended by the extension part,
    wherein the position in the spring member where the spring member is connected to the extension part is set at a position preventing the instrumentation device from coming in contact with the suspending tool even by a vibration of the engine frame, and the instrumentation device is suspended by the spring member with the spring member elongated by its own weight of the instrumentation device, and
    wherein a natural vibration frequency of each of the spring member and the instrumentation device is set outside a resonance occurrence region with respect to a vibration frequency of the engine frame.

2. The installation device for an instrumentation device of a stationary engine according to claim 1,
    wherein the instrumentation device is formed of a major axis cylinder body, the major axis cylinder body is suspended at a plurality of portions in the axial direction by a plurality of the spring members while maintaining a posture in a horizontal direction, and a natural vibration frequency of each spring member is adjusted, thereby to adjust the natural vibration frequency of the whole spring members.

3. The installation device for an instrumentation device of a stationary engine according to claim 1,
    wherein the instrumentation device is formed of a major axis cylinder body, a lead wire is connected to opposite ends in an axial direction of the major axis cylinder body, and the major axis cylinder body is suspended by the spring member while maintaining a posture in a vertical direction.

4. The installation device for an instrumentation device of a stationary engine according to claim 1,
    wherein the spring member comprises double coil springs concentrically disposed and wound in mutually opposite directions, and a natural vibration frequency of each coil spring is adjusted, thereby to adjust the natural vibration frequency of the whole spring members.

5. The installation device for an instrumentation device of a stationary engine according to claim 1,
   wherein the spring member comprises a coil spring, and a natural vibration frequency of the coil spring is made variable by changing an axial pitch of the coil spring.

* * * * *